United States Patent
Russell et al.

(10) Patent No.: US 6,705,369 B1
(45) Date of Patent: Mar. 16, 2004

(54) DEFORMABLE VALVE EXTENSION SUPPORT WITH RETENTION FLANGES

(76) Inventors: Vincent T. Russell, 20253 Colleen Ct., Strongsville, OH (US) 44149; Douglas M. Terrill, 1484 Woodlake Blvd., Stow, OH (US) 44224; David E. Kritzell, 135 E. Long Lake Blvd., Akron, OH (US) 44319

(*) Notice: Subject to any disclaimer, the term of this patent is extended or adjusted under 35 U.S.C. 154(b) by 95 days.

(21) Appl. No.: 10/081,697

(22) Filed: Feb. 22, 2002

(51) Int. Cl.[7] .......................... B60C 23/10; F16K 31/44
(52) U.S. Cl. ......................................... 152/427; 251/233
(58) Field of Search ................................ 152/417, 415, 152/418, 427, 428, 429, 430; 251/233, 243

(56) References Cited

U.S. PATENT DOCUMENTS

| | | | | |
|---|---|---|---|---|
| 1,558,025 A | * | 10/1925 | Ludwick | 152/415 |
| 1,693,859 A | | 12/1928 | Nelson | |
| 1,697,814 A | | 1/1929 | Forbes | |
| 1,736,191 A | * | 11/1929 | Dundin et al. | 152/415 |
| 1,882,455 A | * | 10/1932 | Spicer | 137/225 |
| 1,931,637 A | * | 10/1933 | Wahl | 137/223 |
| 1,931,649 A | | 10/1933 | Eger | |
| 1,934,972 A | | 11/1933 | Frank | |
| 1,971,604 A | | 8/1934 | Frank | |
| 2,316,461 A | * | 4/1943 | Schubert | 200/61.25 |
| 2,362,883 A | * | 11/1944 | Cecil | 200/61.25 |
| 2,463,335 A | * | 3/1949 | Warnshuis et al. | 200/61.25 |
| 2,679,654 A | * | 6/1954 | Hosking | 7/170 |
| 2,812,000 A | | 11/1957 | Trinca | |
| 3,033,263 A | | 5/1962 | Greco | |
| 3,087,529 A | | 4/1963 | Morton | |
| 3,463,552 A | * | 8/1969 | Colletti | 301/36.1 |
| 3,511,295 A | | 5/1970 | Kilmarx | |
| 3,542,109 A | | 11/1970 | Dickson | |
| 4,398,574 A | * | 8/1983 | Moore | 141/1 |
| 4,427,237 A | | 1/1984 | Beegle | |
| 4,724,880 A | | 2/1988 | Voornas | |
| 4,883,106 A | * | 11/1989 | Schultz et al. | 152/417 |
| 5,158,122 A | * | 10/1992 | Moffett | 141/38 |
| 5,203,391 A | * | 4/1993 | Fox | 152/416 |
| 5,244,026 A | * | 9/1993 | Yasushi | 152/415 |
| 5,313,997 A | | 5/1994 | Bias et al. | |
| 5,377,736 A | * | 1/1995 | Stech | 277/414 |
| 5,398,744 A | * | 3/1995 | Street et al. | 152/429 |
| 5,429,167 A | * | 7/1995 | Jensen | 152/417 |
| 5,538,062 A | * | 7/1996 | Stech | 152/417 |
| 6,105,645 A | * | 8/2000 | Ingram | 152/415 |
| 6,325,124 B1 | * | 12/2001 | Colussi et al. | 152/417 |
| 6,382,268 B1 | * | 5/2002 | Lin | 141/67 |
| 6,425,427 B1 | * | 7/2002 | Stech | 152/417 |
| 6,457,502 B1 | * | 10/2002 | Bell et al. | 152/416 |
| 6,497,262 B1 | * | 12/2002 | Skoff et al. | 152/415 |

* cited by examiner

*Primary Examiner*—S. Joseph Morano
*Assistant Examiner*—Long Bao Nguyen
(74) *Attorney, Agent, or Firm*—Coats & Bennett, P.L.L.C.

(57) ABSTRACT

A single piece valve extension support for vehicles with dualled tires and wheels using inflation valve extensions on the inner wheel. The valve extension support, made from a compressible elastomeric foam material, has an orifice through which the valve extension can pass. The valve extension support is inserted in the vent hole of the outer wheel, compressing the foam elastomeric material and generating an interference fit with the vent hole. The valve extension support is compressed around the valve extension passing through its' orifice. In this way, the valve extension support is able to dampen vibration that can lead to fatigue cracks in the inflation valve assembly, causing loss of air pressure in the inner dual tire and wheel assembly. Retention flanges on either side of the wheel prevent accidental removal of the valve extension support.

17 Claims, 3 Drawing Sheets

DEFORMABLE VALVE EXTENSION SUPPORT WITH RETENTION FLANGES

BACKGROUND OF THE INVENTION

This invention relates to dual wheel structures on vehicles, such as those found on tractor-trailers, and more particularly to a valve extension support for use in dual wheel applications that dampens vibration of a valve extension attached to the inflation valve of the inner dual wheel.

In wheel applications where wheels are dualled on an axle, it is often necessary to increase the length of the inflation valve associated with the inner wheel so that it can be more easily accessed from the outside of the vehicle to allow for proper monitoring and adjustment of the inner tire's air pressure. The most common method for lengthening the inflation valve is to use an inflation valve extension. Typically, the inflation valve extension takes the form of a small diameter metal tubular device that attaches to the end of the inflation valve of the inner wheel and extends outward through a vent hole in the outer wheel.

Unfortunately, the weight of the inflation valve extension, coupled with the high rotational speeds of wheels in service, increases the vibration magnitude and stress on the inner wheel's inflation valve during service. This leads to fatigue cracks in the inflation valve, often resulting in a loss of tire pressure that may in turn lead to tire damage and/or poor fuel economy.

Hence, there is a need for a device that can be used to dampen the vibration of an inflation valve fitted with a valve extension installed on an inner dual wheel. Preferably, the device should fit various wheel designs, be easily installed and removed, remain secured after installation, be lightweight, allow access to the end of the inflation valve assembly, and be resistant to a variety of environmental conditions.

BRIEF SUMMARY OF INVENTION

A valve extension support of the present invention may be used with dualled wheels, where the outer wheel has a vent hole that the valve extension protrudes through. The valve extension support includes a deformable substantially cylindrical main body formed from elastomeric foam material and having inboard and outboard ends. The valve extension support is deformable between three states: an undeformed state, an installed state, and an installation state. The main body has a cross-sectional dimension larger than the vent hole in the undeformed state, but is deformable to be disposed through the vent hole in the installed state. The main body has an associated outboard retention flange at or towards one end, and an associated inboard retention flange at or towards the other end. The outboard flange has a plan view cross-sectional dimension larger than the vent hole in the undeformed and installed states. The inboard retention flange has a cross-sectional dimension larger than the vent hole in the undeformed state and in the installed state, but may be deformed to be smaller than the vent hole in the insertion state. In this manner, the valve extension support may be inserted into the vent hole, and remains deformed while in the vent hole. The main body has a passage passing therethrough that is adapted to grip the valve extension in the installed state due to the deformation of the main body from being "squeezed" in the vent hole.

Once installed, the inboard and outboard retention flanges are disposed on opposite sides of the outboard wheel. The two retention flanges are preferably spaced such that the outboard wheel is not laterally squeezed between the flanges, thereby allowing the valve extension support to be easily oriented in a variety of positions relative to the vent hole. The two retention flanges may be substantially identical, or may be different. There may be an optional valve end recess on one or both sides of the valve extension support to provide clearance for monitoring air pressure.

With the retention flanges on both ends of the valve extension support, the valve extension support device is safely retained in the vent hole, such that vibration and motion of the wheel in normal operation should not cause the valve extension support to become dislodged from the outboard wheel. The interference compression fit of the valve extension support device in the vent hole also prevents it from becoming dislodged is service.

The valve extension support device can be removed by pushing or pulling it out of the vent hole. Sufficient force must be exerted to overcome the interference fit and collapse the appropriate retention flange.

The valve extension support should be made from a low density elastomeric foam material, preferably of a heat resistant closed cell type with ultraviolet light and ozone inhibitors.

DETAILED DESCRIPTION OF THE INVENTION

Figure 1:
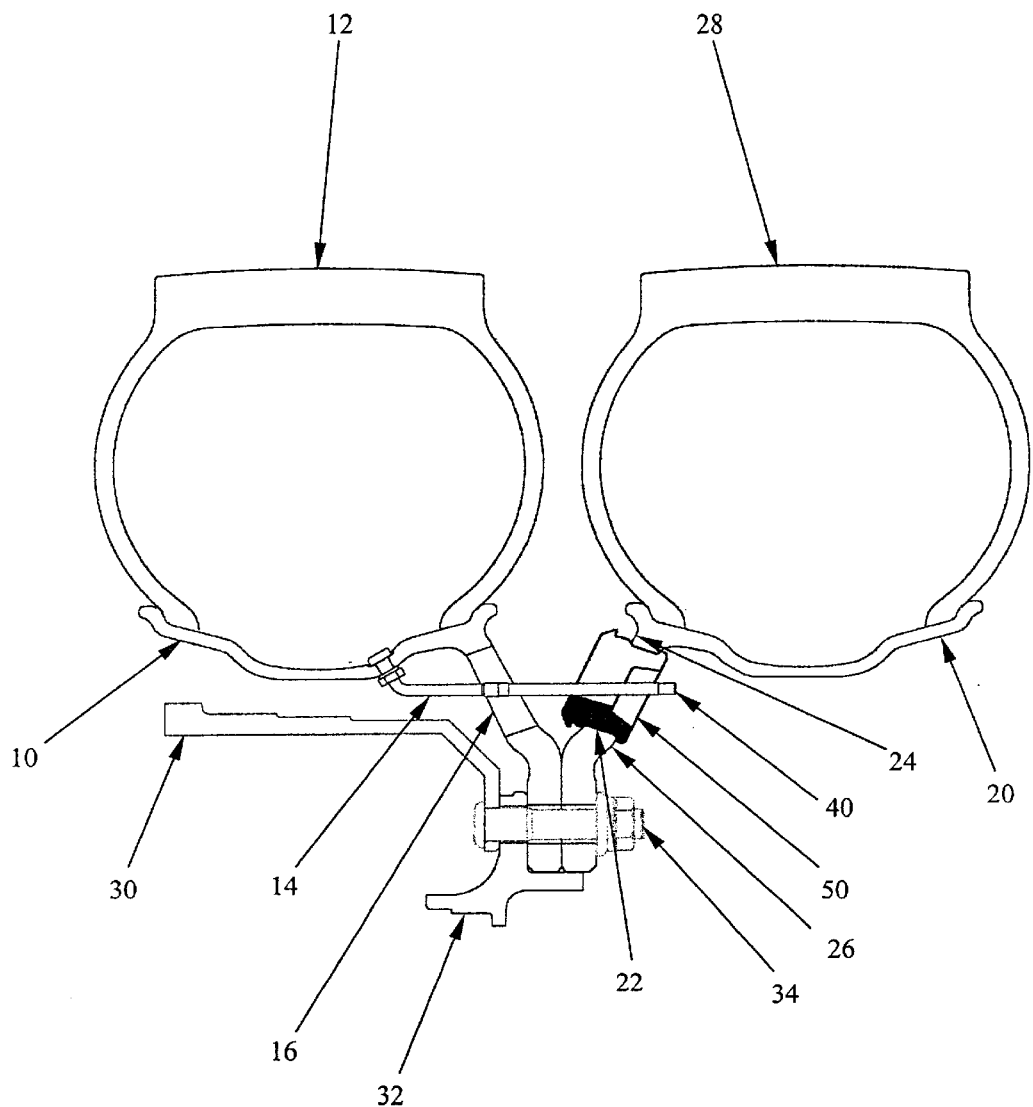
FIG. 1 shows a dualled wheel assembly with a valve extension support according to the present invention.

Referring now to FIG. 1, an inner dual wheel 10 and inner dual tire 12 are shown mounted on a vehicle, over the axle end components such as the brake drum 30, hub 32, and wheel studs 34. Also shown is the corresponding outer dual wheel 20 and outer dual tire 28, mounted such that one of the vent holes 22 of the outer wheel 20 aligns with the inflation valve 14 of the inner wheel 10. As shown, it is typical for the inflation valve 14 to extend in a general axial direction toward, and possibly through, a vent hole 16 in the inner wheel 10. An inflation valve extension 40 is attached to the end of the inflation valve 14, in a manner well known in the art. The inflation valve extension 40 passes through the corresponding vent hole 22 in the outer wheel 20, so as to allow for proper monitoring and adjustment of the air pressure of the inner tire 12.

The valve extension support 50 of the present invention is inserted into the vent hole 22 of the outer wheel 20, and generally surrounds the valve extension 40 in that area. It is intended that the valve extension support 50 grip the valve extension 40 in the area proximate the vent hole 22 of the outer wheel 20, thereby minimizing the motion of the valve extension 40 relative the inner and outer wheels 10,20.

The valve extension support 50 includes a generally cylindrical main body 60, an orifice 52 forming a passage through the main body 60, a inner retention flange 70, and an outer retention flange 80. The retention flange 70 is disposed proximate one end of the main body 60. The retention flange 70 should be larger in cross section than the vent hole 22 in at least one direction when viewed along the axis of the valve extension support 50. At the back of the retention flange 70 may be a retention lip surface 74 that cooperates with the backside disc face 24 of the outer wheel 20 so as to prevent the valve extension support 50 from coming out of the wheel vent hole 22 during operation of the vehicle. Behind the retention flange 70 may be a relief groove 76 that allows the retention flange 70 to collapse when pushed into the wheel vent hole 22. The leading edge 72 of the retention flange 70 should preferably be a chamfered, tapered or radiused to ease installation of the retention flange 70 through the vent hole 22 of the outer wheel 20.

Figure 2:
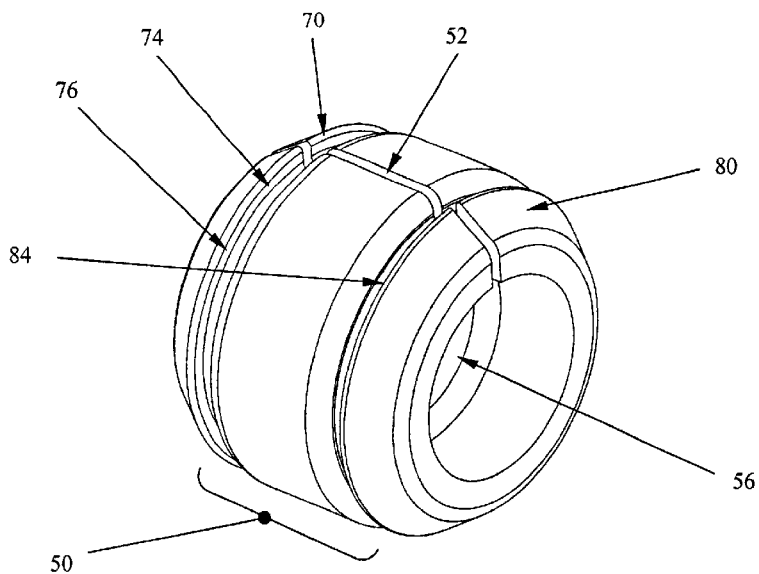
FIG. 2 shows one embodiment of the valve extension support according to the present invention.
Figure 3:
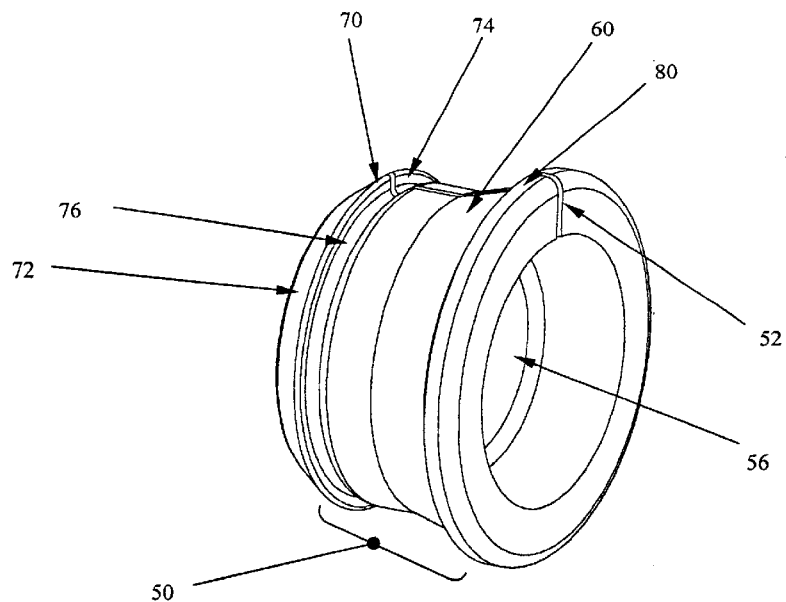
FIG. 3 shows another embodiment of the valve extension support according to the present invention.
Figures 4, 5:
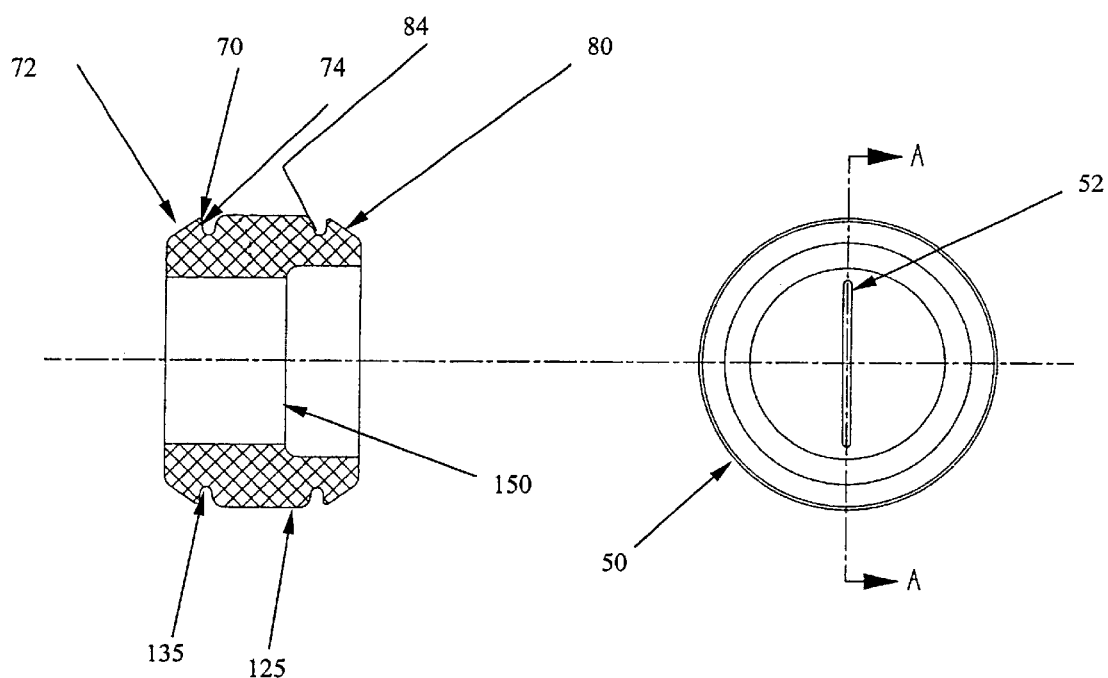
FIG. 4 shows a plan view of the valve extension support of FIG. 2, but with a slot type orifice.
FIG. 5 shows a sectional view through section line A—A of FIG. 4.

As shown in FIG. 2, the outer retention flange 80 may be substantially identical to the inner retention flange 70, with a corresponding retention lip surface 84 and groove. Alternatively, as shown in FIG. 3, the outer retention flange may take a different configuration. The purpose of the outer retention flange 80 is to help prevent the valve extension support 50 from being pushed too far through the wheel vent hole 22 during installation or in the installed state. It is intended that the retention lip surface 84 contact the outside disc face 26 of the outer dual wheel 20 when the valve extension support 50 is pushed into the wheel vent hole 22, thereby preventing over-insertion of the valve extension support 50.

As shown in FIG. 2, the orifice 52 may take the form of a centrally located hole; alternatively, the orifice may take the form of a slit, slot, or the like that allows for passage of the valve extension 40 through the main body 60 of the valve extension support 50. It is intended that the interior surfaces of the orifice 52 form around the valve extension 40 when the valve extension support 50 is installed in the wheel vent hole 22 of the outer dual wheel 20, as discussed further below.

The valve extension support 50 is made from a compressible elastomeric foam material, such as closed-cell an elastomeric foam material made from polyolefin or other suitable material. The elastomeric foam material has significant spring-back to allow the valve extension support 50 to return to its nominal shape in a variety of environmental conditions. In addition, the elasticity of the material generates the compressive fit that grips the valve extension 40 and aids in retention of the device 50 in the vent hole 22, as discussed further below.

The body 60 of the valve extension support 50 is larger in cross-sectional size than the vent hole 22 in its undeformed state. This size difference provides an interference fit between the valve extension support 50 and the wheel vent hole 22 and compresses the elastomeric material of the valve extension support 50. The resistance of the main body 60 of valve extension support 50 to this compression helps to keep the valve extension support 50 properly installed through the vent hole 22. Further, and more directly related to the prime benefit of the present invention, compression of the valve extension support 50 aids in gripping the valve extension tube 40 to dampen vibration.

To install the valve extension 40, the valve extension 40 is passed through the orifice 52 of the valve extension support, and the valve extension support 50 is pressed into the wheel vent hole 22. More particularly, the leading edge 72 of the valve extension support 50 is directed towards and then through the vent hole 22. As the leading edge 72 passes through the vent hole 22, the inner retention flange 70 is temporarily deformed. When the inner retention flange 70 passes the vent hole 22, ending the insertion state, the inner retention flange 70 should substantially return to its undeformed configuration on inboard side of wheel 20. However, the main body 60 is now engaged by the vent hole 22. The difference in cross-sectional size between the main body 60 and the vent hole 22 causes the main body 60 to be compressed, as discussed above. This compression of the valve extension support 50 in the installed state causes compression of the interior surfaces of the orifice 52 against the valve extension 40. As the valve extension 40 is substantially surrounded radially within the orifice 52, with the main body 60 of the valve extension support 50 compressed against the valve extension 40 and disposed between the valve extension 40 and the edges of the vent hole 22, the relative radial motion of the valve extension 40 is quite restricted with respect to the vent hole 22. This compression-formed radial restriction results in a substantial reduction or dampening of the vibration induced in the valve extension 40. To complete the installation, the valve extension 40, with the valve extension support 50 gripped thereto, may then be screwed or otherwise attached to the inflation valve 14. Alternatively, the valve extension may be connected to the inflation valve 14 first, and then the valve extension support 50 placed around the valve extension 40 and inserted into the vent hole 22 by moving the valve extension support inward along the valve extension 40.

By virtue of its geometry and elastomeric properties, the orifice 52 in the valve extension support 50 does not restrict the orientation of the inflation valve 14 to a specific position relative to the valve extension support 50 or the vent hole 22 of the outer wheel 20. Therefore, precise alignment of the valve extension 40 is not required. Thus, the valve extension 40 may extend along a line that is not coincident with either the centerline of the vent hole 22, or the valve extension support 50.

The valve extension support 50 acts to reduce the vibration magnitude of the inflation valve assembly when the wheels are in motion. This vibration dampening results in increased service life of the inflation valve 14 fitted with a valve extension 40. The valve extension support 50 of the present invention can be installed and removed easily in a number of wheels due to the elastomeric foam material and design geometry. The valve extension support 50 of the present invention is also lightweight and preferably resistant to a variety of environmental conditions.

The valve extension support 50 may incorporate an optional valve end recess 56 or pocket to allow for easier access to the inflation valve extension 40. The recess 56 also helps reduce the weight of the valve extension support 50. The foam material may be reinforced to prevent tearing in the valve end recess 56 during installation and removal from the outer wheel vent hole 22.

While not required, it is preferred that the distance between the retention lip surfaces 74,84 be greater than the section thickness of the wheel disc at the vent hole 22, leaving a clearance gap between the retention flange 70 and the backside disc face 24, and possibly another gap between the retention flange 80 and the outside disc face 26. These clearance gaps allow the valve extension support 50 to be installed into a variety of wheels without regard for the specific disc section thickness of the wheel 20 in the area of the vent hole 22. In addition, these clearance gaps allow for installation without regard for the relative angles of the vent hole 22, the valve extension 40, and the longitudinal axis of the valve extension support 50. This clearance also provides relief for displaced material when the valve extension support 50 is compressed in the wheel vent hole 22, minimizing the shrink of the valve end recess 56, and thus keeping the distal end of the valve extension 40 (relative to the inner tire 12) readily accessible.

For valve extension supports 50 intended to be installed from one direction, the retention flanges 70,80 may be different, with the outer flange 80 being larger than the inner flange, as shown in FIG. 3. On the other hand, for valve extension supports 50 intended to be installed from either direction, the retention flanges 70,80 may be identical, as shown in FIG. 2, thereby facilitating installation in the "reverse" direction.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of dampening vibration of a valve extension in dualled wheels, comprising:

routing the valve extension through a vent hole in an outboard wheel dualled to an inboard wheel;

connecting said valve extension to an inflation valve associated with said inboard wheel;

disposing a deformable valve extension support formed from elastomeric foam between said valve extension and said vent hole, said valve extension support having a radial compression interference fit with said vent hole, said radial compression interference fit with said vent hole causing a radial compression fit between said valve extension support and said valve extension;

disposing a first retention flange formed on said valve extension support of said outboard wheel; and disposing a second retention flange formed on said valve extension support inboard of said outboard wheel.

2. The method of claim 1 wherein disposing said second retention flange inboard of said outboard wheel comprises deforming said second retention flange while inserting said valve extension support into said vent hole.

3. The method of claim 1 wherein said first and second retention flanges are spaced farther apart than a thickness of said vent hole.

4. The method of claim 3 wherein said valve extension extends along a line not coincident with a center axis of said vent hole.

5. A dual wheel assembly, comprising:

an inboard wheel dualled to an outboard wheel;

said inboard wheel having an inflation valve;

said outboard wheel having a vent hole;

a deformable valve extension support formed from elastomeric foam and extending through said vent hole and having a passage therethrough;

a valve extension mated to said inflation valve and passing through said vent hole and said valve extension support;

said valve extension support being radially compressed in said vent hole and said valve extension being thereby gripped in said passage;

a first retention flange formed on said valve extension support and disposed inboard of said outboard wheel; and a second retention flange formed on said valve extension support and disposed outboard of said outboard wheel.

6. The assembly of claim 5 wherein said first and second retention flanges are spaced farther apart than a thickness of said vent hole.

7. An inflation valve extension support for use with a valve extension having a first cross-sectional dimension and dualled wheels having at least one vent hole having a second cross-sectional dimension, said valve extension support comprising:

a deformable substantially cylindrical main body formed from elastomeric foam material and having first and second ends, said main body having a cross-sectional dimension larger than said second cross-sectional dimension associated with the vent hole in an undeformed state and deformable to be disposed through the vent hole in an installed state;

a first retention flange disposed proximate said first end and having a cross-sectional dimension larger than said second cross-sectional dimension of the vent hole;

a second retention flange spaced from said first retention flange and disposed proximate said second end, said second retention flange having a cross-sectional dimension larger than said second cross-sectional dimension of the vent hole in said undeformed state and in said installed state, said cross-sectional dimension being smaller than said second cross-sectional dimension of the vent hole in a deformed insertion state; and a passage passing through said main body and adapted to grip the valve extension in said installed state due to the deformation of said main body.

8. The valve extension support of claim 7 wherein said second retention flange includes a leading edge disposed distally from said first retention flange, said leading edge having a reduced cross-sectional shape.

9. The valve extension support of claim 8 wherein said leading edge is chamfered.

10. The valve extension support of claim 7 wherein said main body further comprises a recess connecting to said passage and disposed proximate said first retention flange, said recess having a larger cross-sectional dimension than said passage.

11. The valve extension support of claim 7 wherein said first and second retention flanges are substantially identical.

12. The valve extension support of claim 7 further comprising a groove disposed inboard of, and proximate to, said second retention flange.

13. The valve extension support of claim 7 wherein said first and second retention flanges are integrally formed with said main body.

14. The valve extension support of claim 7 wherein said first retention flange is larger in cross-section than said second retention flange.

15. The valve extension support of claim 7 wherein said passage comprises a central hole formed in said main body.

16. The valve extension support of claim 7 further comprising a groove disposed inboard of, and proximate to, said second retention flange, and wherein said passage comprises a central hole formed in said main body;

said main body further comprises a recess connecting to said passage and disposed proximate said first retention flange, said recess having a larger cross-sectional dimension than said passage;

said second retention flange includes a leading edge disposed distally from said first retention flange, said leading edge having a reduced cross-sectional shape; and said first and second retention flanges are substantially identical and integrally formed with said main body.

17. The valve extension support of claim 7 further comprising a groove disposed inboard of, and proximate to, said second retention flange, and wherein said passage comprises a central hole formed in said main body;

said main body further comprises a recess connecting to said passage and disposed proximate said first retention flange, said recess having a larger cross-sectional dimension than said passage;

said second retention flange includes a leading edge disposed distally from said first retention flange, said leading edge having a reduced cross-sectional shape;

said first retention flange is larger in cross-section than said second retention flange; and said first and second retention flanges are integrally formed with said main body.

\* \* \* \* \*